United States Patent

[11] 3,591,129

| [72] | Inventor | Eldon E. Hulsey<br>P.O. Box 533, Conroe, Tex. 77301 |
|---|---|---|
| [21] | Appl No | 794,234 |
| [22] | Filed | Jan. 27, 1969 |
| [45] | Patented | July 6, 1971 |

[54] BALL-TYPE VALVE
4 Claims, 12 Drawing Figs.

[52] U.S. Cl............................................. 251/118, 251/315
[51] Int. Cl............................................ F16k 37/00
[50] Field of Search......................................... 251/118, 315, 298—302, 124, 174, 208, 309, 317, 315

[56] References Cited
UNITED STATES PATENTS

| 660,147 | 10/1900 | Crane............................ | 251/118 X |
| 3,091,428 | 5/1963 | Magos........................... | 251/174 X |
| 3,170,483 | 2/1965 | Milroy........................... | 251/118 X |
| 3,235,224 | 2/1966 | Grove............................ | 251/174 |
| 3,446,477 | 5/1969 | Ainsworth et al............ | 251/118 X |
| 3,404,864 | 10/1968 | Reddy............................ | 251/309 X |
| 2,905,197 | 9/1959 | Janes............................. | 137/625.47 |
| 3,148,695 | 9/1964 | Groen et al.................... | 251/315 X |
| 3,214,133 | 10/1965 | Rodgers et al................. | 251/315 UX |

FOREIGN PATENTS

| 511,268 | 10/1930 | Germany...................... | 251/315 |
| 210,084 | 12/1966 | Sweden........................ | 251/118 |

*Primary Examiner*—Henry T. Klinksiek
*Attorney*—R. Werlin

ABSTRACT: A valve for controlling fluid flow employing a ball-shaped closure member having a flow passage comprising an inlet end portion circular in cross section merging into an outlet end portion defined by a laterally extending slot of generally triangular shape.

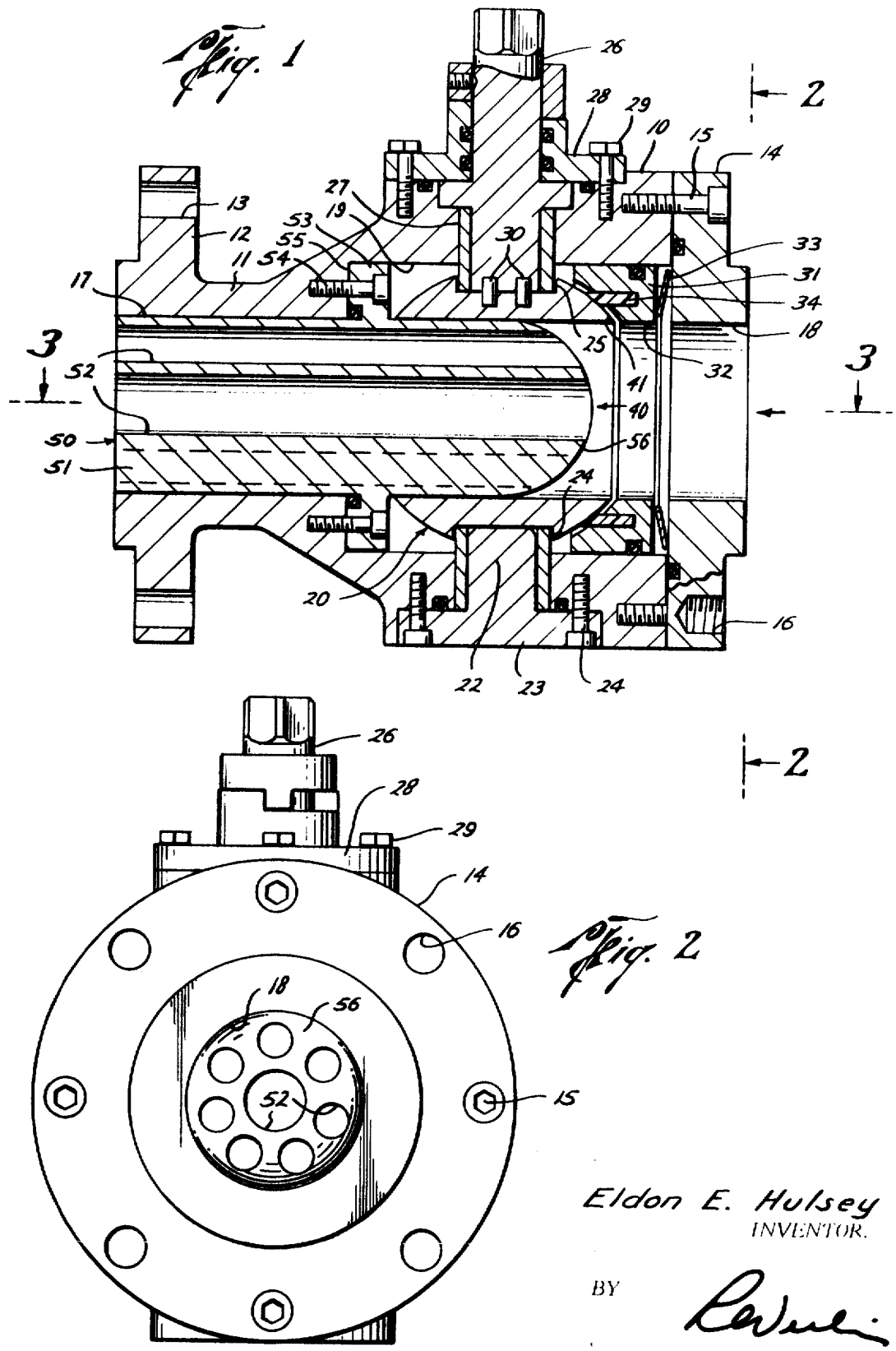

Eldon E. Hulsey
INVENTOR.

BY

ATTORNEY

PATENTED JUL 6 1971

Eldon E. Hulsey
INVENTOR.

BY

ATTORNEY

BALL-TYPE VALVE

Ball-type valves have come into wide use in recent years for the control of fluid flow, particularly high-volume, high-pressure flows, as in oil and gas transmission pipe lines. Ball-type valves, while having certain important advantages over more conventional gate and plug-type valves for such service, are also found to have some significant disadvantages, particularly when operated as control or regulator valves requiring frequent movement over a relatively narrow operating range covering substantially less than the fully open to the fully closed positions.

Conventional ball valves, during movement to partially open condition under high-pressure flows, are subject to large torsional forces, tending to force rotation of the ball closure past the desired position. This results from angular impingement of the fluid entering the flow passage through the ball on the sidewall of the passage of the partly rotated ball. These same angular forces often produce considerable erosion, high-turbulence inside the valve, and considerable noise. The latter is particularly troublesome in metering manifolds of gas transmission and distributing systems where pressure is being reduced from the high supply pressure to the much lower distributing system pressure.

The valve in accordance with the present invention includes a ball-type closure member having a flow passage therethrough of a specialized form which obviates difficulties, such as those exemplified above, experienced with more conventional designs of ball valves. The ball-type closure employs a spherical segment on one side which is arranged to cooperate with an annular seat in the inlet flow port of the valve to form the closure therefor upon appropriate angular movement of the ball about its rotary axis. The flow passage, which extends diametrically of the ball on a main axis which is normal to the axis of the spherical closure segment, has an inlet end which is circular in cross section and merges into an outlet end portion defined by a laterally extending slot of generally triangular shape extending over a quarter section of the ball encompassing the main axis and the axis of the spherical closure segment.

The width of the slot is preferably made substantially equal to the diameter of the inlet portion.

By providing a flow passage of the configuration described, it is found that at any opening less than full opening, the inlet end of the passage will have an ellipsodial shape defined by the intersection of the circular end of the flow passage and the circular bore of the seat. Irrespective of the shape of this opening or the extent of its restriction, fluid flowing through the opening into the flow passage, will not be opposed by the passage wall, since the latter now is replaced by a wide-open slot which communicates with the downstream flow port of the valve. There will thus be no wall surface in the ball subject to angular impingement by the flow of fluid and hence no torsional force on the ball tending to rotate it past the desired opening position. Turbulence will also be greatly reduced, as well as erosion and noise.

An additional important feature of this invention is the provision of a flow-straightening element or core which is mounted in the downstream flow port and projects into the flow passage through the ball to a point closely adjacent the inlet end of the flow passage. The lateral triangular slot in the ball defining the discharge end of the flow passage, enables the ball to be rotated through a quarter turn about the flow-straightening core, between fully open and fully closed positions, the sidewalls of the slot cooperating with the core to limit the angular movement of the ball to the desired extent.

The flow-straightening core may comprise a generally cylindrical body terminating at its inlet end in a generally spherical nose which projects closely adjacent the inlet end of the ball in the open position of the latter but allows free rotation of the ball about the end of the core. The latter is provided with a plurality of parallel ducts or vanes, which are operative to receive the fluid entering the flow passage of the ball at any angular position of the inlet end of the ball and to straighten the fluid flow to a path parallel to the longitudinal axis of the valve and the pipe line in which it is installed.

By employing flow-straightening cores in a ball valve of the kind herein contemplated, the valves may be used particularly advantageously in orifice metering installations of gas transmission and distribution systems, in providing not only the various advantages previously mentioned, but also in substantially reducing the lengths of the meter tubes conventionally required for such installations.

Various other objects and advantages of this invention will become more readily apparent from the following detailed description when read in conjunction with the accompanying drawing which illustrates useful embodiments of the present invention.

In the drawing:

FIG. 1 is a longitudinal, cross-sectional view of a valve in accordance with a preferred embodiment of this invention, the valve being shown in the fully open position;

FIG. 2 is an end elevational view of the inlet end of the valve;

Figure 3:
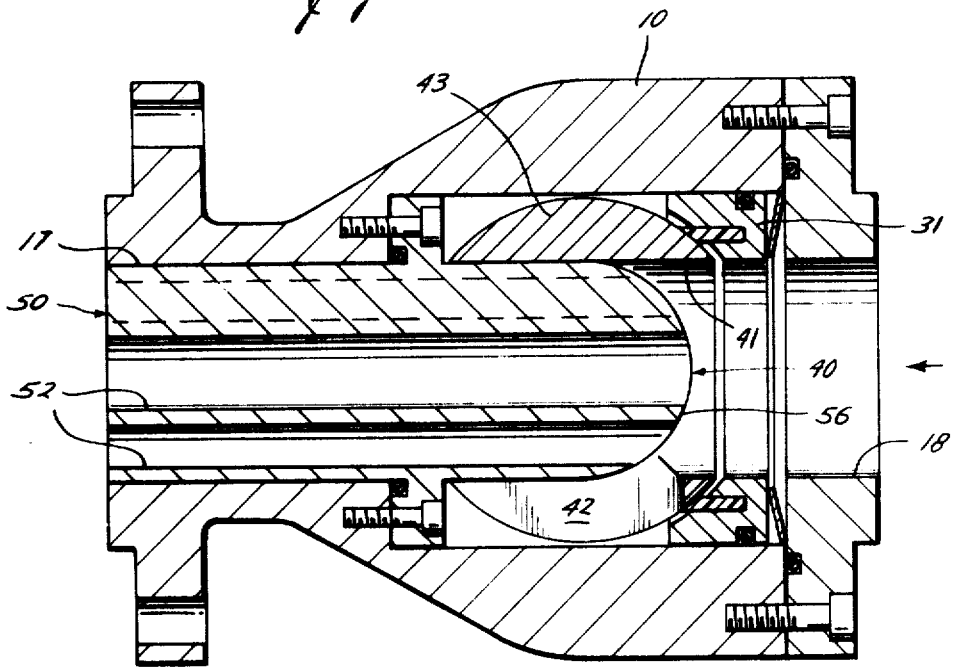
FIG. 3 is a longitudinal cross-sectional view of the valve taken on line 3–3 of FIG. 1.

Referring to the drawing, the valve includes a tubular housing 10 having a nozzle 11 integral therewith and forming the discharge end of the valve. The end of the nozzle is formed with a conventional raised face flange 12 provided with a circle of boltholes 13 for attachment to an adjacent pipe fitting. At the opposite or inlet end, housing 10 is provided with a flat end face for attachment thereto of a raised face flange 14 which is secured to the end of the housing by means of capscrews 15. Flange 14 is provided with a plurality of internally threaded boltholes for attachment of a complementary pipe line fitting. Nozzle 11 has a longitudinally extending flow port 17 which is coaxial with a port 18 in flange 14.

Figure 5:
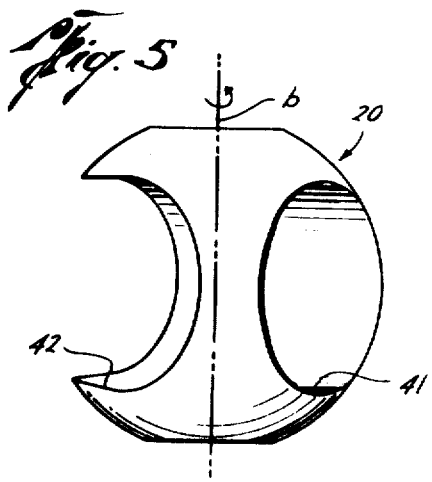
FIG. 5 is a perspective elevational view of the ball member.
Figure 5A:
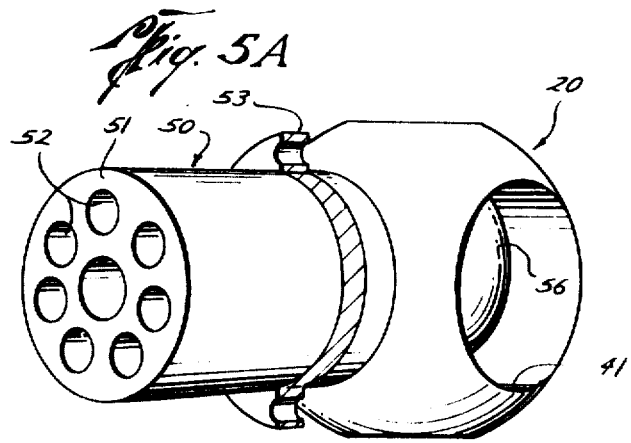
FIG. 5A is a view similar to FIG. 5 but showing the flow-straightening core in place, the ball being in the flowway closing position relative to the core.
Figure 6:
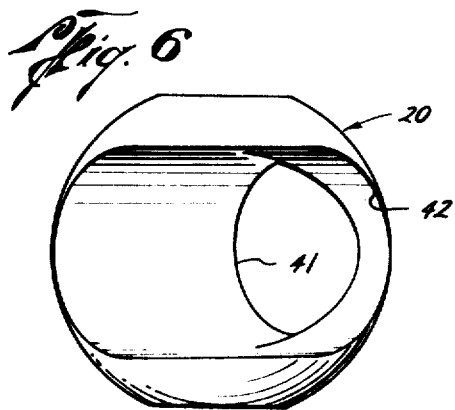
FIG. 6 is a perspective elevational view of the ball similar to FIG. 5 but showing the ball rotated 90° from the position shown in FIG. 5.
Figure 6A:
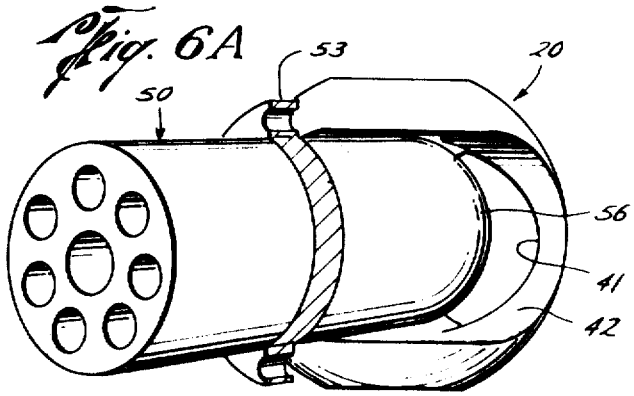
FIG. 6A is similar to FIG. 5A showing the relation of the flow-straightening core and the ball in the full flowway open position of the ball.
Figure 7:
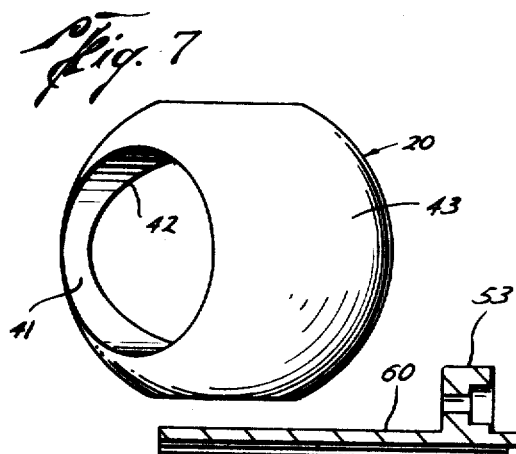
FIG. 7 is a perspective elevational view of the ball looking toward its inlet end.
Figure 7A:
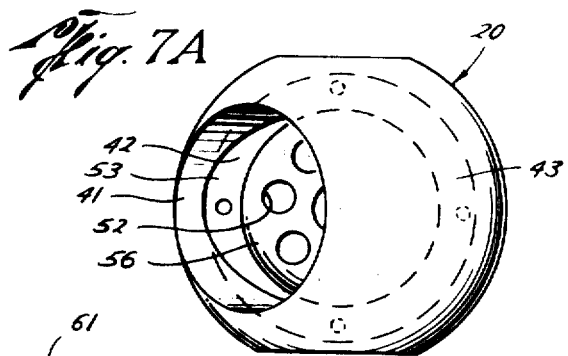
FIG. 7A is a view similar to FIG. 7 with the flow-straightening core in place and the ball in partly open position.

Flow ports 17 and 18 define the flowway through the valve which is intersected by a closure chamber 19 in the valve housing adapted to receive the ball-shaped closure, designated generally by the numeral 20. The latter is mounted for rotation about its vertical axis $b$ (FIG. 5A) on a bottom trunnion 22 mounted to a bottom plate 23 secured to the bottom of the housing by means of the capscrews 24 and projecting upwardly into chamber 19 and into a socket 24 in the bottom of ball 20. The top of ball 20 diametrically opposite socket 24 is provided with a socket 25 which receives the inner end of an operating stem 26 which projects through an opening 27 in the upper wall of housing 10 and through a bonnet 28 which closes opening 27 about the outer end of stem 26, being secured to the housing by capscrews 29. A plurality of keys 30, such as dowel pins or the like, form a seperable, nonrotatable connection between the stem and the ball to enable the latter to be rotated between flowway opening and flowway closing positions in operation of the valve.

An annular seat 31 is slidably seated in the inlet end of the housing and has a bore 32 coaxial with flow port 18 and of the same diameter. A spring is mounted in compression between seat 13 and flange 14 to bias seat 31 inwardly of the closure chamber. The inner end of seat 31 is generally spherically shaped and provided with an inwardly extending annular seal insert 34 shaped to engage the exterior spherical surface of ball 20, so as to maintain continuous sealing engagement with this surface.

Figure 4:
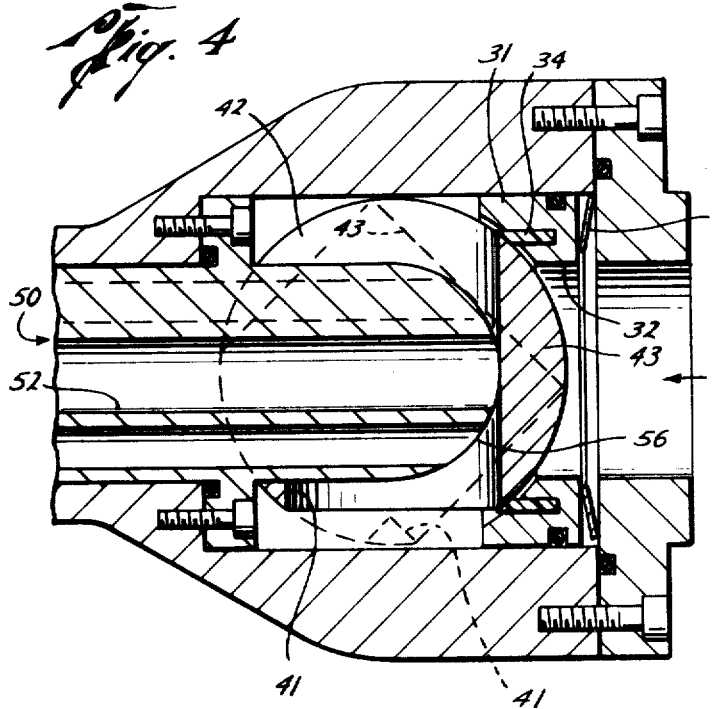
FIG. 4 is a view similar to FIG. 3, showing the ball member in the flowway closing position in solid lines, the broken lines indicating the position of the ball at partly open positions.
Figure 3A:
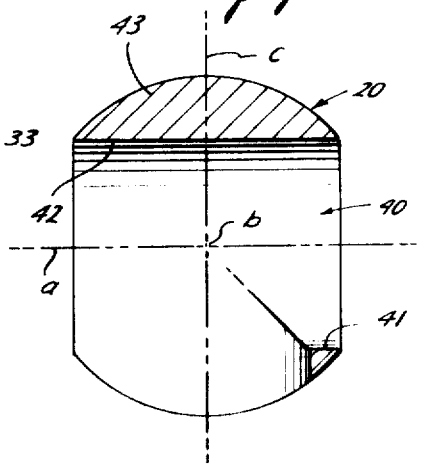
FIG. 3A is a cross-sectional view of the ball closure member, the section being taken along line 3–3 of FIG. 1.

Ball 20 is provided with flow passage, designated generally by the numeral 40, having an inlet end 41 and an outlet end 42, and extending generally diametrically through the center of the ball on a main axis $a$ (FIG. 3A). One side of the ball includes a spherical segment 43 having a spherical axis $c$ (FIG. 3A) intersecting and normal to axis $a$ and axis $b$. Segment 43 comprises the closure segment of the ball which will be rotated about axis $b$ through an angle of 90° between fully open (FIGS. 1 and 3) and fully closed (FIG. 4) positions. In the latter position, seal insert 34 will engage the exterior of segment 43 surrounding inlet flow port 18. The sealing force will be supplied by the upstream pressure supplemented by the force of spring 33. As evident, the direction of fluid flow through the valve will be as indicated by the arrow in FIGS. 1, 3 and 4.

Inlet end 41 of the flow passage is circular while the outlet end of the flow passage is generally L-shaped in transverse cross section, as best seen in FIG. 3A, and comprises a generally triangular slot 42 extending laterally in a plane generally normal to the axis of rotation $b$ and formed by removal of the body quadrant defined between main axis $a$ and spherical axis $c$ on the downstream side of the latter. The vertical width of slot 42 is made substantially equal to the diameter of inlet end 41.

The ball valve heretofore described may be employed to control flow through the flowway of the valve by rotation through an angle of 90° from fully open to fully closed positions, the angular movement being delimited by appropriately located stop lugs on bonnet 28 and stem 26. It will be evident that at any open position less than fully open, fluid flow entering inlet end 41 of the flow passage through the ball will discharge through the wide open lateral slot 42 in passing to the downstream flow port. Since the flow passage through the ball will lack a wall interposed in the path of flow of the fluid, no torsional forces will develop on the ball and turbulence and other undesirable flow conditions will be greatly reduced.

However, in the preferred embodiment of the present invention, the valve will include a flow-straightening core, designated generally by the numeral 50, by means of which the stream of fluid entering the ball will be caused to discharge from the ball in straight line flow parallel to the axis of the valve flowway. This will obviate turbulence which would otherwise develop in the stream, as a result of the angular direction of flow of the entering stream which will occur at less than full open positions of the valve.

In the preferred embodiment, core 50 comprises a generally cylindrical body 51 constructed of any relatively rigid metallic or plastic material and provided with a plurality of parallel ducts 52 extending from end to end of the body. An annular flange 53 is rigidly formed or attached about the exterior of the body and is adapted to be secured by means of screws 54 to a cooperating shoulder 55 formed in the housing at the discharge end of closure chamber 19. The forward or upstream end of body 51 is shaped to form the spherical nose 56. The position of flange 53 with respect to the forward end of body 51 is selected so that when the core is installed in the valve, nose 56 will be closely adjacent to the curved surfaces defining the wall of flow passage 40 in the ball to permit ball 40 to rotate about nose 56 in its angular movement between fully open and fully closed positions. The rearward or discharge end of body 51 is made flush with the raised face of flange 12.

The diameter of core body 51 is made to closely approach the diameter of inlet end 41 and thus to likewise closely approach the width of slot 42. With the core positioned as described and with the dimensional relationship to the parts of flow passage 40 through the ball, it will be seen that the core will cooperate with the walls of slot 42 to limit rotation of the ball to the desired angle of 90° between the fully open and fully closed positions.

As will be evident from the several FIGS. and particularly the views illustrated in FIGS. 5 to 7A, inclusive at any position of the ball between fully open and fully closed, fluid entering inlet end 41 of the ball will, of necessity, be forced to pass through ducts 52 to the discharge end of the valve whereby irrespective of the angle at which it enters inlet end 41, will be forced into straight line flow parallel to the axis of the flowway through the valve when the flow attains the discharge nozzle.

Figure 8:
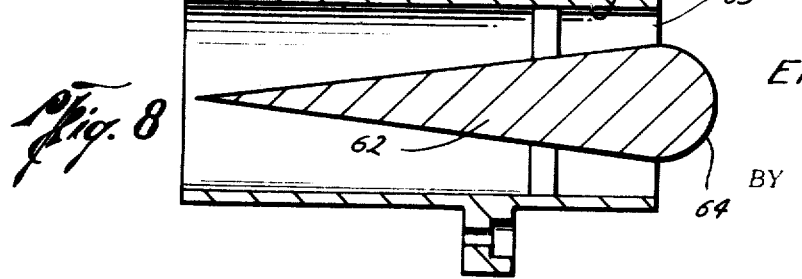
FIG. 8 is longitudinal, sectional view of a modified form of flow-straightening core for use in valves in accordance with this invention.

It will be understood that other types of flow-straightening cores other than the cylindrical tubular duct form illustrated by core 50 may be employed for this purpose. FIG. 8 illustrates another modification. In this design, the core comprises a sleeve 60 fitted with the annular flange 53 for attachment to shoulder 55 in the valve housing. Mounted in the bore 61 of sleeve 60 is generally conical plug 62 having a maximum diameter less than that of bore 61 to provide the annular flow orifice 63 about the plug. Plug 62 is provided with a spherical nose 64 adapted to project into the flow passage of the ball in the same manner as nose 56 in the previous embodiment.

It will be understood that various other modifications may be made in the details of the described embodiments within the scope of the appended claims but without departing from the spirit of this invention. For example, instead of seat-ring 31 and sealing insert 34, any of the many available forms of sealing units may be employed. One such sealing assembly which may be substituted is that disclosed in my copending U.S. Pat. application, Ser. No. 683,756, now U.S. Pat. No. 3,497,177.

What I claim and desire to secure by Letters Patent is:
1. A valve comprising:
   a. a hollow housing having spaced-apart coaxial inlet and outlet flow ports defining a flowway through the housing;
   b. a closure member comprising a generally spherical body mounted in the housing between said flow ports for rotation about a central axis between positions opening and closing said flowway;
   c. annular seat means about said inlet port;
   d. a spherical segment of said body having its spherical axis intersecting and normal to said central axis and defining a closure portion sealingly engageable with said seat means in the flowway closing position;
   e. a generally L-shaped passage through the body comprising a circular inlet end portion extending on a main axis normal to the axis of said spherical segment merging into an outlet end portion defined by a laterally extending slot of generally triangular shape encompassing said spherical and main axes and having a width substantially equal to the diameter of said inlet portion;
   f. a flowway-straightening element mounted in the housing to extend from said outlet flow port into said outlet end portion constructed and arranged to constrain fluid flow axially through said flowway at all positions of said closure member between fully open and fully closed;
   g. said flow-straightening element comprising a cylindrical body having a diameter closely approaching the width of said slot, the inlet end of said body being spherical in shape; a plurality of parallel ducts extending longitudinally from end to end of said body; and means securing said body to the valve housing; and
   h. means carried by the housing for rotating said closure member between said portions.

2. A valve according to claim 1, wherein said seat means is slidably axially of said flow port, and resilient means biasing the seat means toward the closure member.

3. A valve according to claim 1, wherein said seat means comprises a ring-shaped carrier slidable axially of said flow port; an annular deformable sealing insert mounted to the inner end of said carrier; and spring means mounted in the flow port behind the carrier biasing the latter toward the closure member.

4. For use in ball-type control valves, a closure member comprising:
   a. a generally spherical body having a central axis of rotation;
   b. a spherical segment of said body defining a closure portion having its spherical axis intersecting and normal to said central axis;
   c. a main flow passage extending diametrically through the body on a main axis normal to and intersecting said spherical axis;
   d. said flow passage being generally L-shaped in transverse cross section and having an inlet end portion circular in cross section merging into an outlet end portion defined by a laterally extending slot of generally triangular shape encompassing said spherical and main axes and having a width substantially equal to the diameter of said inlet portion.